(12) United States Patent
Ren (10) Patent No.: US 10,171,207 B2
(45) Date of Patent: Jan. 1, 2019

(54) METHODS AND APPARATUS FOR CONTROL BIT DETECTION

(71) Applicant: Tianmin Ren, San Jose, CA (US)

(72) Inventor: Tianmin Ren, San Jose, CA (US)

(73) Assignee: Cavium, LLC, Santa Clara, CA (US)

(*) Notice: Subject to any disclaimer, the term of this patent is extended or adjusted under 35 U.S.C. 154(b) by 0 days.

(21) Appl. No.: 15/498,373

(22) Filed: Apr. 26, 2017

(65) Prior Publication Data

US 2018/0316463 A1    Nov. 1, 2018

(51) Int. Cl.
*H04L 1/00* (2006.01)
*H04L 1/16* (2006.01)
*H04W 72/04* (2009.01)
*H04W 24/02* (2009.01)
*H04W 24/10* (2009.01)

(52) U.S. Cl.
CPC .......... *H04L 1/1607* (2013.01); *H04L 1/0054* (2013.01); *H04W 72/0413* (2013.01); *H04W 24/02* (2013.01); *H04W 24/10* (2013.01)

(58) Field of Classification Search
CPC ..... H04L 1/0054; H04L 1/005; H04L 25/067; H04L 1/0066; H04L 7/048; H04L 1/0071; H04L 1/0081–1/0082; H04L 1/0091; H04L 25/03171; H03M 13/41; H03M 13/4107; H03M 13/6502; G11B 20/10009
USPC .................. 375/259–285, 316–352
See application file for complete search history.

(56) References Cited

U.S. PATENT DOCUMENTS

| | | | | |
|---|---|---|---|---|
| 5,764,690 A * | 6/1998 | Blanchard | ............... | H04B 1/707 370/210 |
| 7,418,063 B2 * | 8/2008 | Chen | .................... | H04B 7/2656 370/324 |
| 7,453,959 B2 * | 11/2008 | Kim | .................. | H03M 13/3723 375/316 |
| 7,580,469 B2 * | 8/2009 | Yonesi | ............... | H03M 13/1102 375/262 |
| 7,623,600 B2 * | 11/2009 | Momtaz | ............... | H03G 3/3084 375/230 |
| 7,657,819 B2 * | 2/2010 | Berkmann | ........ | H03M 13/2975 375/262 |
| 7,924,934 B2 * | 4/2011 | Birmingham | ........ | H04M 11/066 375/265 |
| 8,315,342 B2 * | 11/2012 | Reial | .................. | H04B 1/71072 375/340 |
| 8,462,890 B2 * | 6/2013 | Stewart | ............. | H03M 13/3769 375/147 |
| 8,514,956 B2 * | 8/2013 | Yang | .................... | H04L 1/0045 370/203 |

(Continued)

*Primary Examiner* — James M Perez
(74) *Attorney, Agent, or Firm* — James M. Wu; JW Law Group (57) ABSTRACT

Methods and apparatus for control bit detection. In an exemplary embodiment, a method includes receiving an LLR sequence (l) that includes P control bits and calculating a sum of LLR squares parameter (L) associated with the LLR sequence. The method also includes generating a value (Vp) for each of the $2^P$ combination of the control bits. Each Vp value is based on a parameter sequence and the LLR sequence. The method also includes determining a smallest value of Vp, and outputting a determination that a control bit combination was received if the smallest value of Vp is less than a threshold value (THD) multiplied by the parameter L.

20 Claims, 5 Drawing Sheets

(56) References Cited

U.S. PATENT DOCUMENTS

| | | | | |
|---|---|---|---|---|
| 8,549,387 B2* | 10/2013 | Lee | H03M 13/1111 | 714/752 |
| 8,588,322 B2* | 11/2013 | Siti | H04L 1/06 | 375/267 |
| 8,705,638 B2* | 4/2014 | Ren | H04B 7/0456 | 375/259 |
| 9,007,886 B2* | 4/2015 | Xie | H04J 13/14 | 370/208 |
| 9,025,480 B2* | 5/2015 | Ren | H04B 1/1027 | 370/252 |
| 9,160,578 B2* | 10/2015 | Paker | H04L 25/0246 | |
| 9,172,450 B2* | 10/2015 | Qin | H04L 1/0631 | |
| 9,240,864 B2* | 1/2016 | Luo | H04L 1/0054 | |
| 9,270,297 B2* | 2/2016 | Sharon | H03M 13/1117 | |
| 9,356,733 B2* | 5/2016 | Wu | H04L 25/03242 | |
| 9,363,036 B1* | 6/2016 | Zhang | H04L 1/0009 | |
| 9,591,656 B2* | 3/2017 | Huang | H04L 1/0019 | |
| 9,686,069 B2* | 6/2017 | Chen | H04L 5/006 | |
| 2008/0008257 A1* | 1/2008 | Yonesi | H03M 13/1102 | 375/262 |
| 2008/0109701 A1* | 5/2008 | Yu | H03M 13/258 | 714/760 |
| 2008/0212694 A1* | 9/2008 | Leach | H04L 1/0054 | 375/260 |
| 2008/0279312 A1* | 11/2008 | Stewart | H03M 13/3769 | 375/340 |
| 2011/0280346 A1* | 11/2011 | Yang | H04L 1/0045 | 375/341 |
| 2012/0128083 A1* | 5/2012 | Ren | H04L 25/03343 | 375/259 |
| 2012/0281542 A1* | 11/2012 | Xiao | H04L 1/0054 | 370/241 |
| 2012/0314561 A1* | 12/2012 | Xie | H04L 27/2605 | 370/210 |
| 2013/0051270 A1* | 2/2013 | Ren | H04B 1/1027 | 370/252 |
| 2013/0205176 A1* | 8/2013 | Qian | H04L 1/0038 | 714/704 |
| 2013/0322287 A1* | 12/2013 | Bontu | H04L 1/0015 | 370/252 |
| 2014/0119420 A1* | 5/2014 | Hewavithana | H04L 27/2649 | 375/227 |
| 2014/0153625 A1* | 6/2014 | Vojcic | H04L 1/005 | 375/224 |
| 2014/0274085 A1* | 9/2014 | Kwak | H04L 5/0037 | 455/450 |
| 2015/0296524 A1* | 10/2015 | Huang | H04L 1/0019 | 370/329 |
| 2017/0163289 A1* | 6/2017 | Myung | H03M 13/1148 | |
| 2017/0366199 A1* | 12/2017 | Ge | H03M 13/09 | |

* cited by examiner

METHODS AND APPARATUS FOR CONTROL BIT DETECTION

FIELD

The exemplary embodiments of the present invention relate to telecommunications networks. More specifically, the exemplary embodiments of the present invention relate to receiving and processing data streams via a wireless communication network.

BACKGROUND

There is a rapidly growing trend toward mobile and remote data access over high-speed communication networks, such as provided by 3G or 4G cellular services. For example, using these services, users now rely on their smartphones for texting, access to email, banking, and social media, and for sending and receiving pictures and video.

Typically, wireless network performance depends in part on the quality of the transmission channel. For example, if the channel conditions are good, the network may perform with higher speed and capacity than when the channel conditions are poor. To obtain the best network performance, wireless networks may rely on user devices (e.g., user equipment "UE") to report control information back to the network. The control information includes parameters indicating the channel conditions and/or transmission parameters. One way user devices report control information back to the network is through a physical uplink shared channel (PUSCH). The network receives the control information over this shared channel and uses the received parameters to adjust data transmissions for optimum performance based on the network conditions indicated by the received parameters.

One use of the control information is to provide acknowledgement information that is transmitted from a UE to the network server through the PUSCH. For example, after a user device receives a transmission from a network server, it generates control bits representing an acknowledgement (ACK) that indicates whether or not the transmission was properly received. These control bits are transmitted back to the network server through the PUSCH so that the server can determine from the received ACK whether the transmission was properly received and initiate a retransmission if necessary.

Thus, the use of control bit information can enhance the operation of the communication network to provide fast and efficient network services. In one case, the control bit information is encoded in transmissions from the UE. When the control bit information is received at the network server it needs to be decoded to be utilized. Unfortunately, conventional detection algorithm may not receive and decode the control bit information properly. For example, in the case of control bit information used to transmit packet acknowledgement, if a packet is successfully received, the UE will respond by sending control bits representing an ACK back to the transmitting server. If a packet is not successfully received, the UE will send control bits representing a NACK back to the transmitting server. A missed detection occurs when the server does not detect an ACK sent by a UE. A false alarm occurs when the server detects an ACK even though the UE did not send one. Unfortunately, conventional control bit detection has proven to be less than optimal in properly detecting the reception of the control bit transmissions, which results in reduce network performance.

Therefore, it is desirable to have a detection mechanism that efficiently detects with high probability the reception of control bit information transmitted from a UE.

SUMMARY

In various exemplary embodiments, methods and apparatus are provided for control bit detection. For example, exemplary embodiments are suitable for detecting 1-bit or 2-bit control information transmitted by UE. When the number of control bits (P) is (1 or 2) with each control bit being 0 or 1, there are $2^P$ possible control bit combinations that can be detected. One of the combinations is mapped to a bit sequence that is transmitted by UE. In an exemplary embodiment, a control bit detector operates to determine which combination is transmitted given the LLRs of the received bit sequence. The control bit detector detects the reception of control bits with high probability, which results in improved network performance.

In an exemplary embodiment, a method is provided that includes operations of receiving an LLR sequence (1) that includes P control bits and calculating a sum of LLR squares parameter (L) associated with the LLR sequence. The method also includes an operation of generating a value (Vp) for each of $2^P$ combinations of the control bits. Each value (Vp) is computed from a parameter sequence and the LLR sequence. The method also includes an operation of determining a smallest value of Vp, and an operation of outputting a determination that an ACK was received if the smallest value of Vp is less than a threshold value (THD) multiplied by the parameter L.

In another exemplary embodiment, an apparatus is provided that includes a receiver that receives an LLR sequence (1) that includes P control bits. The apparatus also includes a processor that performs operations of: calculating a sum of LLR squares parameter (L) associated with the LLR sequence; generating a value (Vp) for each of $2^P$ combinations of the control bits, wherein each value (Vp) is computed from a parameter sequence and the LLR sequence; and determining a smallest value of Vp. The apparatus also includes an output interface that outputs a determination that an ACK was received if the smallest value of Vp is less than a threshold value (THD) multiplied by the parameter L.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and/or business related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

Aspects of the present invention described below disclose methods and apparatus for detection of control information in a wireless communications network.

Figure 1:
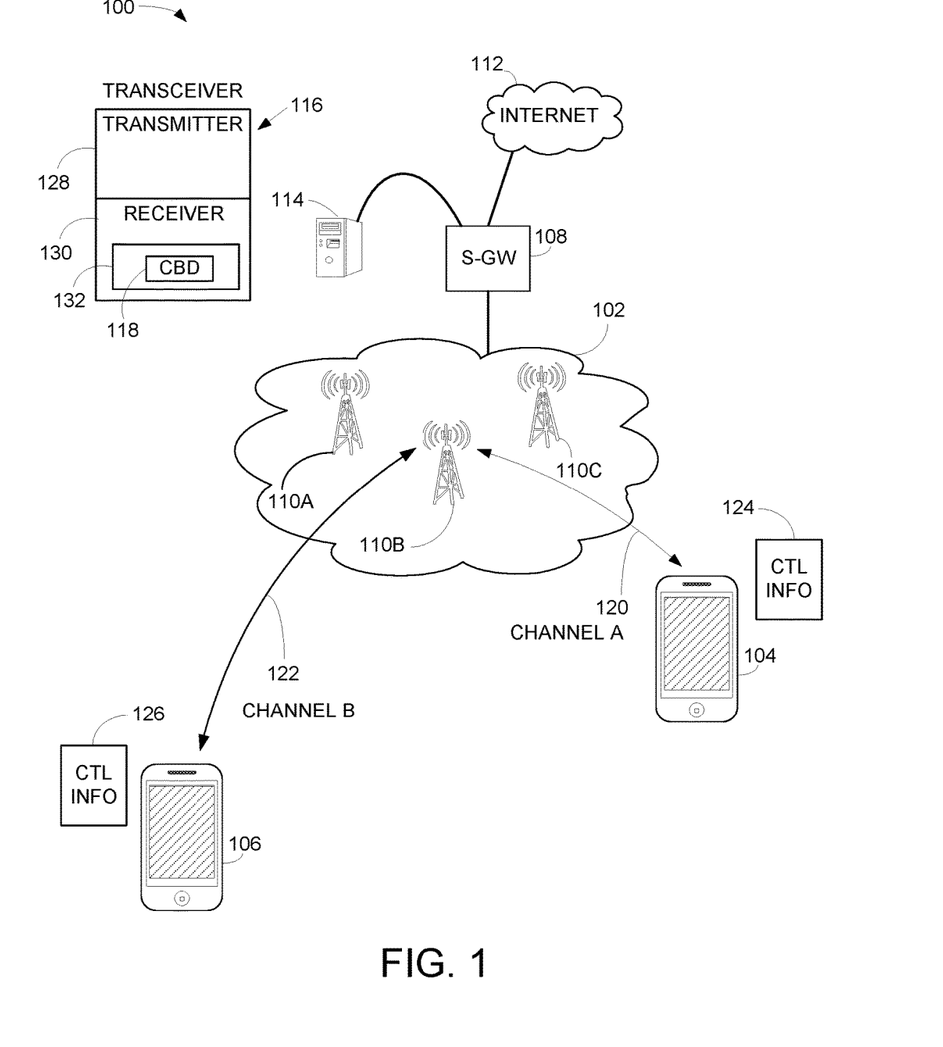
FIG. 1 shows a communication network comprising a transceiver having an exemplary embodiment of a control bit detector that detects the reception of control bits received from user equipment.

FIG. 1 shows a communication network 100 comprising a transceiver 116 having an exemplary embodiment of a control bit detector (CBD) 118 configured to efficiently receive and detect control bit information transmitted from user equipment. The network 100 may also be referred to as a third generation (3G), 4G, LTE, or combination of 3G and 4G cellular network configuration.

The communication network 100 includes a server 114 that includes the transceiver 116. The transceiver 116 has a transmitter portion 128 and a receiver portion 130. The server 114 is configured to communicate with a serving gateway (S-GW) 108 that is further configured to communicate with cell site 102 and the Internet 112. The cell site 102 includes radio towers 110 and associated base stations (not shown).

User equipment (UE) 104 is in communication with base station 110B using channel A 120 and user equipment 106 is in communication with base station 110B using channel B 122. For example, the UEs can be cellular phones, handheld devices, tablet computers or iPad® devices. It should be noted that the underlying concepts of the exemplary embodiments of the present invention would not change if one or more blocks (or devices) were added or removed from the communication network 100. In an exemplary embodiment, the UE 104 transmits control bit information 124 to the server 114 over channel A and the UE 106 transmits control bit information 126 to the server 114 over channel B.

The receiver portion 130 includes receiver processing hardware (RPH) 132. In an exemplary embodiment, the RPH 132 includes the CBD 118, which is used to perform efficient detection of the control bit information (124, 126) received from UEs (104, 106). For example, the CBD 118 is able to detect the control bit information from received subframes with higher probability than conventional systems to enhance the overall efficiency of the receiver and the operation of the communication network 100.

Figure 2:
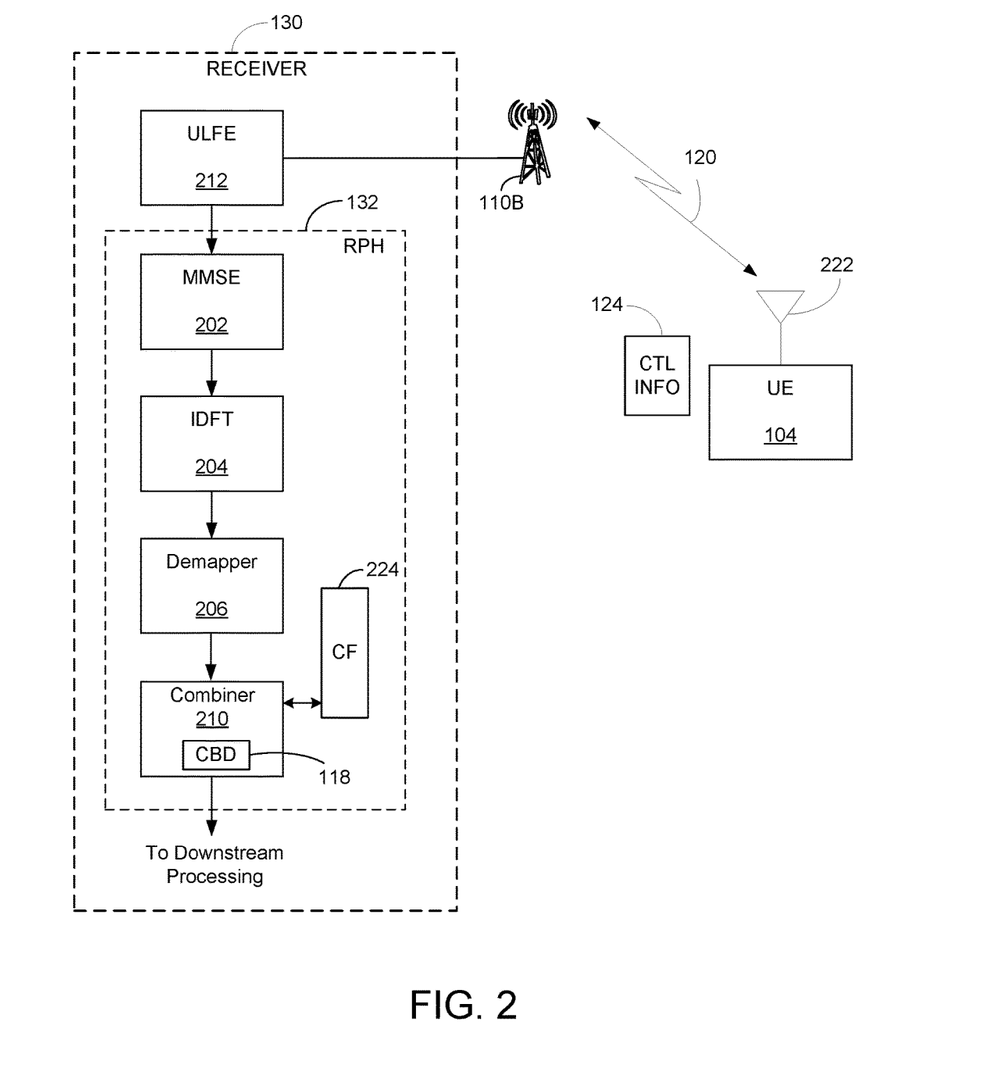
FIG. 2 shows a diagram illustrating an exemplary uplink transmission of control bits from a UE through a communication network to a receiver that includes an exemplary embodiment of the control bit detector shown in FIG. 1.

FIG. 2 shows a diagram illustrating an exemplary uplink transmission from a UE through a communication network to a receiver having an exemplary embodiment of the CBD 118. For example, an uplink transmission of control bit information 124 transmitted from the UE 104 flows over channel A 120 through the communication network 100 to the receiver portion 130 of the transceiver 116. As an example, the UE 104 generates the control bit information 124 to represent acknowledgement information and transmits this control information using antenna 222 to the tower 110B, as illustrated by transmission 120. In an exemplary embodiment, the control information 124 is transmitted over a PUSCH to the receiver 130. At the receiver portion 130, the uplink transmission is received at an uplink front end (ULFE) 212. After receiving the uplink transmission, the ULFE 212 passes received information to receiver processing hardware (RPH) 132.

The RPH 132, in one exemplary embodiment, includes MMSE 202, IDFT 204, demapper 206, decoder 208 and combiner 210. In an exemplary embodiment, the RPH 132 includes configuration parameters (CF) 224 and the signal combiner 210 includes an exemplary embodiment of the CBD 118. The RPH 132 is configured to process control information received by the ULFE 212 and the result of such processing is output to a decoder (not shown). The control information is used to facilitate efficient communication over a wireless communication network, such as the network 100.

The MMSE 202, in one example, includes an equalizer with serial interference cancellation ("SIC") capability. The MMSE 202 generates estimated values using a function of mean-square-error or equalization of received signals or bit stream(s) during the signal processing phase. MMSE 202 also provides functionalities to equalize multiple streams of data received simultaneously over the air. For instance, the number of bit streams such as one (1) to eight (8) streams can arrive simultaneously.

The IDFT 204 converts symbols or samples between frequency domains. After conversion, the IDFT 204 may store the symbols or samples in a storage matrix (not shown). Depending on the application, the IDFT 204 passes the symbols to the next logic block, which is the demapper 206. The storage matrix is a local storage memory which can reside in the IDFT 204, the demapper 206, or at an independent storage location.

The Demapper 206 operates to demap or ascertain soft bit information associated with received symbol(s) or bit stream(s). For example, demapper 206 employs a soft demapping principle, which is based on computing the log-likelihood ratio (LLR) of a bit that quantifies the level of certainty as to whether it is a logical zero or one. To reduce noise and interference, the demapper 206 is also capable of discarding one or more unused constellation points relating to the frequency of the bit stream from the constellation map.

The Combiner 210 provides a combining function that combines LLR bits to form bit streams to be decoded. In an exemplary embodiment, the combiner 210 includes an exemplary embodiment of the CBD 118. As disclosed in greater detail below, the CBD 118 is able to detect the control bit information in a received subframe with higher probability than conventional systems to enhance the overall efficiency of the RPH 132 and the operation of the communication network.

The RPH 132 also includes CF 224 that provides configuration parameters to the various functions blocks of the RPH 132. Although the CF 224 is shown only in communication with the combiner 210, in various exemplary embodiments, the CF 224 communicates with other components of the RPH 132 to provide configuration parameters as necessary.

Figure 3:
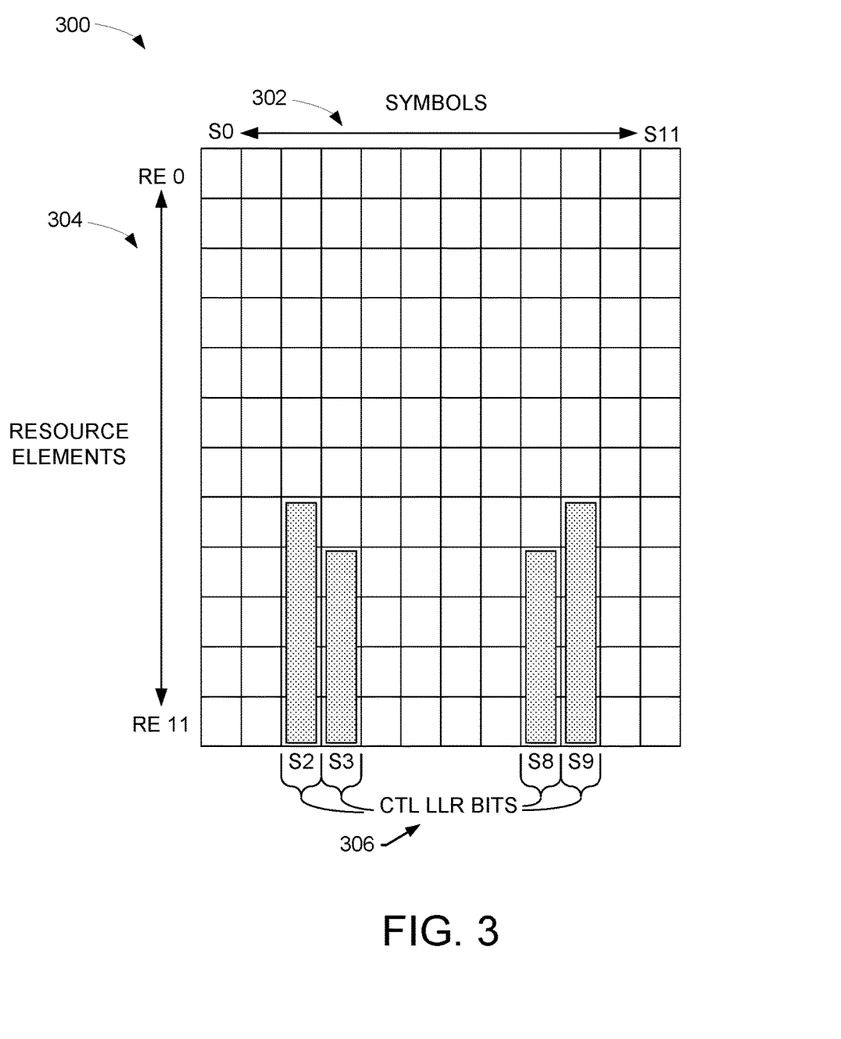
FIG. 3 shows an exemplary subframe that includes resource elements containing control bits transmitted from a UE.

FIG. 3 shows an exemplary subframe 300 that includes resource elements (RE) containing control bit LLRs transmitted from a UE. For example, the subframe 300 comprises symbols 302 and resource elements 304. The bits indicated at 306 represent the control bit LLRs received in the subframe 300 that are transmitted from a UE, such as UE 104.

The subframe 300 comprises twelve symbols 302 for each row of resource elements 304. In an exemplary embodiment, each symbol comprises bits representing two values. For example, as illustrated in the subframe 300, the control bit LLRs appear in symbols 2 and 9 of resource elements 7-11 and symbols 3 and 8 of resource elements 8-11. It should be noted that the subframe 300 in FIG. 3 is exemplary and that other configurations with different numbers of REs are possible for the LLR arrangements for the control bits.

Figure 4:
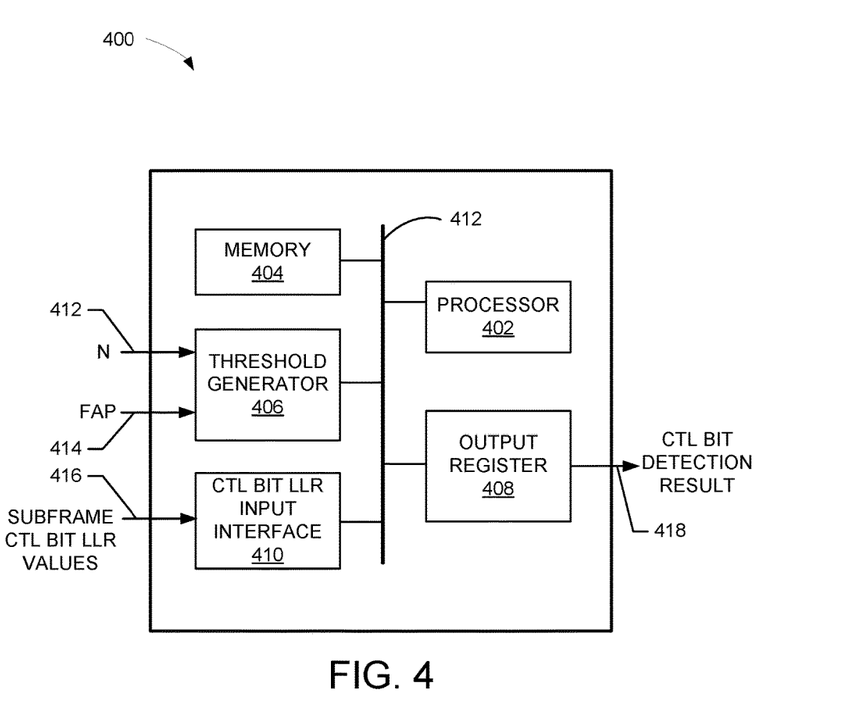
FIG. 4 shows a detailed exemplary embodiment of a control bit detector.

FIG. 4 shows a detailed exemplary embodiment of a control bit detector 400. For example, the CBD 400 is suitable for use as the CBD 118 shown in FIGS. 1-2. The CBD 400 operates to receive control bit LLR values contained in a received subframe and detects whether or not the corresponding control bits are successfully received.

The CBD 400 comprises processor 402, memory 404, and threshold generator 406, control bit LLR input interface 410 and output register 408. Although shown separately, the components of FIG. 4 also can be combined in any combination and/or arrangement within the scope of the embodiments. It should be noted that the underlying concept of the exemplary embodiments of the present invention would not change if one or more components were added or removed from the CBD 400 shown in FIG. 4.

The processor 402 comprises at least one of a CPU, processor, state machine, programmable logic, memory, hardware, and/or discrete components that perform the functions described herein.

The memory 404 comprises any suitable memory, such as RAM, PROM, or other type of memory.

The threshold generator 406 comprises at least one of a CPU, processor, state machine, programmable logic, memory, hardware, and/or discrete components that perform the functions described herein. For example, the threshold generator 406 operates to generate a threshold value that is used in a control bit detection process.

The control bit LLR input interface 410 comprises at least one of registers, gates, latches, hardware components, and/or discrete components that receive subframe control bit LLR information. For example, in an exemplary embodiment, the interface 410 receives the control bit LLR information and stores this information in the memory 404. For example, for a 1-bit control bit case, each bit is either zero or one and the received LLR sequence (l) may be (for example) either [1 1 1 1 1 1 1 1 1] or [1 1 1 1 1 1 1 1 1 1 1]. For a 2-bit control bit case, the received LLR sequence (l) may be (for example) one of [1 1, 1 1, 1 1, 1 1, 1 1], [1−1, 1−1, 1−1, 1−1, 1, −1], [−1 1, −1 1, −1 1, −1 1, −1 1] or [−1−1, −1−1, −1−1, −1−1, −1−1].

The output register 408 comprises at least one of registers, gates, latches, hardware components, and/or discrete components that output the control bit detection results. For example, in an exemplary embodiment, the processor 402 controls the interface 410 to output the control bit detection result.

During operation, the threshold generator 406 receives a value N 412 and a false alarm probability (FAP) indicator 414. The threshold generator 406 uses the received parameters to generates a threshold value that is used in the control bit detection process.

The LLR input interface 410 receives LLR values 416 representing LLR control bits derived from a received subframe. For example, in an exemplary embodiment, the LLR values 416 represent 1-bit or 2-bit ACK/NACK values received from a UE. The interface 410 stores these values in the memory 404 and also inputs these values to the processor 402.

The processor 402 performs a detection algorithm to detect whether control bits in the current subframe are successfully received. The detection algorithm processes the received LLR bits to obtain a value that is compared to the threshold generated by the threshold generator 406. The comparison determines whether the control bits in the subframe were successfully received. A more detailed description of the detection algorithm performed by the processor 402 is provided below in the description of the method 500.

Figure 5:
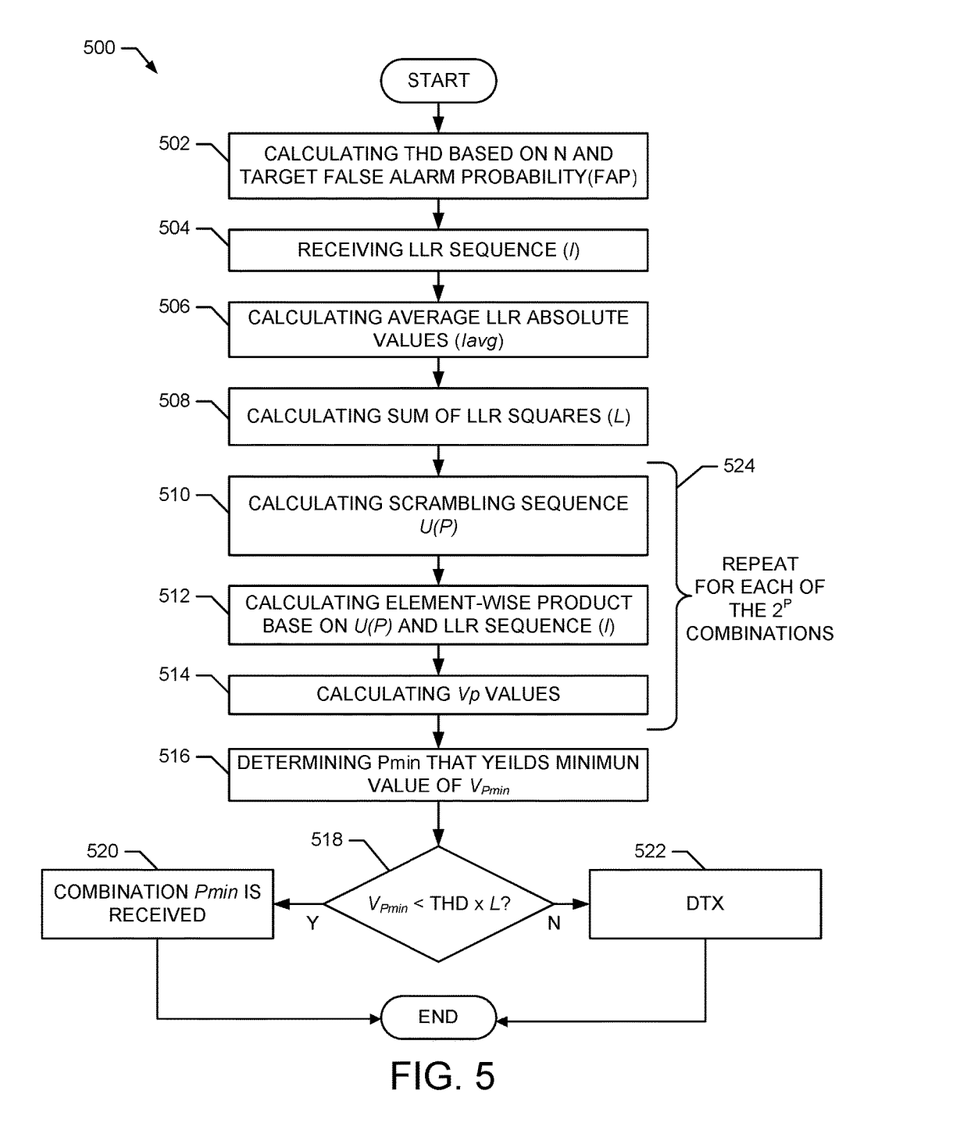
FIG. 5 shows an exemplary method for efficiently detecting control bits received from user equipment.

FIG. 5 shows an exemplary method 500 for control bit detection using an exemplary embodiment of control bit detector in accordance with the present invention. For example, the method 500 is suitable for use with the control bit detector 400 shown in FIG. 4.

Block 502 comprises an operation of calculating a threshold (THD). In an exemplary embodiment, the threshold is calculated based on a value of N (defined as the length of the LLR sequence) and a target or desired false alarm probability (FAP) value. In an exemplary embodiment, the threshold is determined by the threshold generator 406 based on the parameter N 412 and the target FAP 414. The threshold (THD) does not depend on the specific wireless channel and modulation scheme, and therefore can be calculated offline. In an exemplary embodiment, the threshold generator 406 determines the threshold value according to the following operations. First, a target false alarm probability (FAP) value is defined as $(p_{fa})$. Next, a value $n_{0,max}$, is calculated according to the following expression.

$$n_{0,max} = \max n_0, \text{ such that } \sum_{n=0}^{n_0} \binom{N}{n} \bigg/ 2^N < p_{fa}$$

Finally, the threshold value (THD) is selected to be in the range between the following values;

$$\frac{4n_{0,max}}{N} \text{ and } \frac{4(n_{0,max}+1)}{N}.$$

Block 504 comprises an operation of receiving an LLR sequence. For example, input LLRs ($l_0, l_1, l_2, l_3, \ldots l_{N-1}$) are received on REs allocated for control bits transmitted in one subframe. In an exemplary embodiment, the subframe input interface 410 receives the LLR sequence and stores the sequence in the memory 404.

Block 506 comprises an operation of calculating an average of the LLR absolute values. For example, in an exemplary embodiment, the processor 402 obtains the received LLR sequence either directly from the interface 410 or from the memory 404 and calculates the average of the LLR absolute values according to the following expression.

$$\bar{l} = \frac{\sum_{n=0}^{N-1}|l_n|}{N}$$

Block 508 comprises an operation of calculating a sum of squares of the LLR values. For example, in an exemplary embodiment, the processor 402 obtains the received LLR sequence either directly from the interface 410 or from the memory 404 and calculates the sum of squares of the LLR values according to the following expression.

$$L = \sum_{n=0}^{N-1} l_n^2$$

The operations at blocks 510, 512 and 514 repeated for each of the $2^P$ control bit combinations, as indicated at 524.

Block 510 comprises calculating scrambling sequence corresponding to one of the combinations of p. For example, if p equal 2 there are $2^P$ (4) combinations and thus a scrambling sequence for one of the combinations is calculated. For example, in an exemplary embodiment, the processor 402 calculates the scrambling sequence u(p) according to the following expression.

$$u(p) = (u_0^p, u_1^p, \ldots u_{N-1}^p)$$

Block 512 comprises an operation of calculating a new sequence that is the element-wise products of the scrambling sequence u(p) and the received LLR sequence. For example, in an exemplary embodiment, the processor 402 calculates the new sequence according to the following expression.

$$(s_0^p, s_1^p, \ldots s_{N-1}^p) = (l_0(1-2u_0^p), l_1(1-2u_1^p), \ldots l_{N-1}(1-2u_{N-1}^p))$$

Block 514 comprises an operation of calculating a value Vp from the new sequence generated at block 512 and the average of the absolute values of the LLR sequence generated at block 506. For example, in an exemplary embodiment, the processor 402 calculates the parameter Vp according to the following expression.

$$v_p = \sum_{n=0}^{N-1}(s_n^p - \bar{l})^2$$

Block 516 comprises an operation of determining a value $p_{min}$ from the values of Vp determined after the operations at 510, 512, and 514 have been performed for each of the $2^P$ control bit combinations, as indicated at 524. For example, in an exemplary embodiment, the processor 402 calculates the parameter $p_{min}$ according to the following expression.

$$p_{min} = \operatorname{argmin}_{p=1,2,\ldots 2^p}\{v_p\}$$

Block 518 comprises an operation of determining whether $Vp_{min}$ is less than the threshold value (THD) (determined at block 502) multiplied by the sum of squares of the LLR values (L) (determined at block 508). For example, in an exemplary embodiment, the processor 402 makes this determination by determining whether the following expression is true.

$$v_{p_{min}} < THD \times L$$

If the above expression is true, the method proceeds to block 520, and if the above expression is not true, the method proceeds to block 522.

Block 520 comprises an operation of outputting a determination that the combination $p_{min}$ has been received. For example, in an exemplary embodiment, the processor 402 controls the output interface 408 to output the determination 418 that the combination $p_{min}$ has been received.

Block 522 comprises an operation of outputting a determination that the UE did not transmit (DTX) control bit information. For example, in an exemplary embodiment, the processor 402 controls the output interface 408 to output the determination 418 that the UE DTX.

Thus, the method 500 operates to efficiently detect control bits received in an uplink transmission in accordance with an exemplary embodiment of the present invention.

The exemplary aspect of the present invention includes various processing steps as described above. The steps may be embodied in machine or computer executable instructions. The instructions can be used to cause special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those skilled in the art that, based upon the teachings herein, changes and modifications may be made without departing from these exemplary embodiments and their broader aspects. Therefore, the appended claims are intended to encompass within their scope all such changes and modifications as are within the true spirit and scope of these exemplary embodiments of the present invention.

What is claimed is:

1. A method of detecting control bit information from a user equipment (UE) via a communication network which includes at least one radio tower, switching network, and a control bit detector (CBD), wherein the CBD includes a threshold generator, a control bit log-likelihood ratio (LLR) input interface, a processor, and an output register, the method comprising:

receiving, at the control bit LLR input interface, an LLR sequence (l) that includes P control bits;
calculating, at the processor, a sum of LLR squares parameter (L) associated with the LLR sequence;
generating a (Vp) value for each of $2^P$ combinations of the control bits, wherein each Vp value is computed based on a new sequence and the LLR sequence;
determining, by the processor, a smallest value of Vp; and
outputting, by the CBD, a determination that a control bit combination was received if the smallest value of Vp is less than a threshold value (THD) multiplied by the parameter L.

2. The method of claim 1, further comprising pre-calculating the threshold value based on a value N and a target false alarm probability (FAP) value.

3. The method of claim 1, further comprising generating the value Vp based on an average of absolute values (lavg) of the LLR sequence.

4. The method of claim 3, further comprising calculating (lavg) according to $$\bar{l} = \frac{\sum_{n=0}^{N-1} |l_n|}{N}.$$

5. The method of claim 3, wherein the operation of generating the Vp value for each of the $2^P$ combinations of the control bits comprises:
for each of the $2^P$ combinations of the control bits, performing operations of:
generating a scrambling sequence u(p) corresponding to a selected combination of the control bits;
calculating the new sequence from an element-wise product stream based on u(p) and l; and
calculating the Vp value from the new sequence and the lavg.

6. The method of claim 5, wherein the operation of generating the scrambling sequence u(p) comprises generating the scrambling sequence u(p) according to $u(p)=(u_0^P, u_1^P, \ldots u_{N-1}^P)$.

7. The method of claim 5, wherein the operation of calculating the new sequence comprises calculating the new sequence according to $(s_0^P, s_1^P, \ldots s_{N-1}^P)=(l_0(1-2u_0^P), l_1(1-2u_1^P), \ldots l_{N-1}(1-2u_{N-1}^P))$.

8. The method of claim 5, wherein the operation of calculating the values of Vp comprises calculating the values of Vp according to $$v_p = \sum_{n=0}^{N-1} (s_n^p - \bar{l})^2.$$

9. The method of claim 5, wherein each element of the scrambling sequence u(p) is either one or zero.

10. The method of claim 1, further comprising outputting a did not transmit (DTX) determination if the smallest value of Vp is not less than the threshold multiplied by L.

11. The method of claim 1, further comprising receiving the LLR sequence in a subframe of symbols in an uplink transmission from user equipment (UE).

12. The method of claim 11, wherein the uplink transmission comprises an LTE uplink transmission.

13. The method of claim 11, wherein the uplink transmission is received over a physical uplink shared channel (PUSCH).

14. An apparatus configured to detect control bit information from a user equipment (UE) via a communication network which includes at least one radio tower, a switching network, and a transceiver containing a receiver portion, wherein the receiver portion includes a control bit detector (CBD), the CBD comprising:
a control bit log-likelihood ratio (LLR) input interface configured to receive an LLR sequence (l) that includes P control bits from the UE;
a processor coupled to the control bit LLR input interface that performs operations of:
calculating a sum of LLR squares parameter (L) associated with the LLR sequence;
generating a (Vp) value for each of $2^P$ combinations of the control bits, wherein each Vp value is based on a new sequence and the LLR sequence; and
determining a smallest value of Vp; and
an output interface coupled to the processor configured to output a determination that a control bit combination was received if the smallest value of Vp is less than a threshold value (THD) multiplied by the parameter L.

15. The apparatus of claim 14, wherein the processor performs an operation of calculating an average of absolute values (lavg) of the LLR sequence.

16. The apparatus of claim 14, wherein the processor performs an operation of calculating (lavg) according to $$\bar{l} = \frac{\sum_{n=0}^{N-1} |l_n|}{N}.$$

17. The apparatus of claim 14, wherein the operation of generating comprises:
for each of the $2^P$ combinations of the control bits, performing operations of:
generating a scrambling sequence u(p) corresponding to a selected combination of the control bits;
calculating the new sequence from an element-wise product stream based on u(p) and l; and
calculating the Vp value from the new sequence and an average of absolute values (lavg) of the LLR sequence.

18. The apparatus of claim 17, wherein the operation of generating the scrambling sequence comprises generating the scrambling sequence u(p) according to $u(p)=(u_0^P, u_1^P, \ldots u_{N-1}^P)$.

19. The apparatus of claim 17, wherein the operation of calculating the new sequence comprises calculating the new sequence according to $(s_0^P, s_1^P, \ldots s_{N-1}^P)=(l_0(1-2u_0^P), l_1(1-2u_1^P), \ldots l_{N-1}(1-2u_{N-1}^P))$.

20. The apparatus of claim 17, wherein the operation of calculating the Vp value comprises calculating the Vp value according to $$v_p = \sum_{n=0}^{N-1} (s_n^p - \bar{l})^2.$$

* * * * *